(12) United States Patent
Malik et al.

(10) Patent No.: US 12,354,607 B2
(45) Date of Patent: Jul. 8, 2025

(54) SECURE AUTOMATIC SPEAKER VERIFICATION SYSTEM

(71) Applicant: THE REGENTS OF THE UNIVERSITY OF MICHIGAN, Ann Arbor, MI (US)

(72) Inventors: Hafiz Malik, Ann Arbor, MI (US); Syed Irtaza, Ann Arbor, MI (US); Muteb Aljasem, Dearborn, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 222 days.

(21) Appl. No.: 17/792,283

(22) PCT Filed: Jan. 12, 2021

(86) PCT No.: PCT/US2021/013131
§ 371 (c)(1),
(2) Date: Jul. 12, 2022

(87) PCT Pub. No.: WO2021/146214
PCT Pub. Date: Jul. 22, 2021

(65) Prior Publication Data
US 2023/0073364 A1    Mar. 9, 2023

Related U.S. Application Data

(60) Provisional application No. 62/960,356, filed on Jan. 13, 2020.

(51) Int. Cl.
| | | |
|---|---|---|
| *G10L 17/04* | (2013.01) | |
| *G10L 17/06* | (2013.01) | |
| *G10L 25/24* | (2013.01) | |

(52) U.S. Cl.
CPC .............. *G10L 17/04* (2013.01); *G10L 17/06* (2013.01); *G10L 25/24* (2013.01)

(58) Field of Classification Search
USPC .......................... 704/246, 247, 251, 252, 275
See application file for complete search history.

(56) References Cited

U.S. PATENT DOCUMENTS

| | | |
|---|---|---|
| 6,480,825 B1 | 11/2002 | Sharma et al. |
| 2012/0179704 A1 | 7/2012 | Xu et al. |
| (Continued) | | |

FOREIGN PATENT DOCUMENTS

| | | |
|---|---|---|
| CN | 108281158 A | 7/2018 |
| CN | 110491391 A | 11/2019 |
| WO | WO-2019136909 A1 | 7/2019 |

OTHER PUBLICATIONS

Adnan, Syed M. et al. "Fall detection through acoustic Local Ternary Patterns", Applied Acoustics, vol. 140 (2018), pp. 296-300.
(Continued)

*Primary Examiner* — Leonard Saint-Cyr
(74) *Attorney, Agent, or Firm* — Harness, Dickey & Pierce, P.L.C.

(57) ABSTRACT

Traditional speaker verification systems are vulnerable to voice spoofing attacks, such as voice-replay attack, voice-cloning attack, and cloned-replay attack. To overcome these vulnerabilities, a secure automatic speaker verification system based on a novel sign modified acoustic local ternary pattern (sm-ALTP) features and asymmetric bagging-based classifier-ensemble with enhanced attack vector is presented. The proposed audio representation approach clusters the high and low frequency components in audio frames by normally distributing them against a convex function. Afterwards, the neighborhood statistics are applied to capture the user specific vocal tract information.

18 Claims, 6 Drawing Sheets

(56) References Cited

U.S. PATENT DOCUMENTS

| | | | |
|---|---|---|---|
| 2013/0226587 A1 | 8/2013 | Cheung et al. | |
| 2015/0301796 A1 | 10/2015 | Visser et al. | |
| 2018/0106897 A1* | 4/2018 | Shouldice | A61B 5/0507 |
| 2018/0189228 A1 | 7/2018 | Park et al. | |
| 2018/0189609 A1 | 7/2018 | Park et al. | |
| 2019/0298271 A1 | 10/2019 | Zigel et al. | |
| 2019/0384898 A1* | 12/2019 | Chen | G06F 21/36 |
| 2020/0309930 A1* | 10/2020 | Zhou | G01S 15/86 |

OTHER PUBLICATIONS

International Search Report and Written Opinion regarding International Application No. PCT/US2021/013131, mailed Apr. 1, 2021; ISA/US.

Shim, Hye-Jin et al., "Replay spoofing detection system for automatic speaker verification using mulit-task learning of noise classes", arxiv.org, Cornell University Library, 201 Olin Library Cornell University Ithaca, NY 14853, Aug. 29, 2018.

Irtaza, Aun et al., "A Framework for Fall Detection of Elderly People by Analyzing Environmental Sounds through Acoustic Local Ternary Patterns", 2017 IEEE International Conference on Systems, Man, and Cybernetics (SMC), IEEE, Oct. 5, 2017, pp. 1558-1563.

"A framework for fall detection of elderly people by analyzing environmental sounds through acoustic local ternary patterns" Aun Irtaza 2017 IEEE International Conference on Systems, Man, and Cybernetics 1558-1563 ?

* cited by examiner

Original

*Fig-4A*

Cloned

|              | Neural-wave | Vocoder-1 | Vocoder-2 | Waveform | Vocoder-3 | Spectral |
|---|---|---|---|---|---|---|
| Neural-wave  | 2594 | 28   | 8    | 19   | 10   |      |
| Vocoder-1    | 7    | 2583 | 1    | 2    | 8    |      |
| Vocoder-2    | 4    | 6    | 2618 | 5    | 1    | 3    |
| Waveform     | 12   | 10   | 25   | 2564 | 17   | 25   |
| Vocoder-3    | 6    | 9    |      | 4    | 2646 |      |
| Spectral     | 1    |      | 2    | 11   |      | 2645 |

True Class (y-axis) / Predicted Class (x-axis)

*Fig-8*

SECURE AUTOMATIC SPEAKER VERIFICATION SYSTEM

CROSS-REFERENCE TO RELATED APPLICATION

This application is a 371 U.S. National Phase of International Application PCT/US2021/013131, filed on Jan. 12, 2021, which claims the benefit of U.S. Provisional Application No. 62/960,356 filed on Jan. 13, 2020. The entire disclosures of the above applications are incorporated herein by reference.

GOVERNMENT CLAUSE

This invention was made with government support under CNS1816019 awarded by the National Science Foundation. The government has certain rights in the invention.

FIELD

The present disclosure relates to secure automatic speaker verification.

BACKGROUND

Automatic speaker verification (ASV) is an essential component of the voice biometric applications. These applications authenticate the speakers based on their unique vocal characteristics and protects the user accounts against the identity theft. However, due to the synthetic audio generation algorithms, and counterfeited audios through digital manipulation, security breaches occur that fails the ASV systems, hence making the voice biometric applications unreliable. Similarly, the smart speakers and many voice enabled IoT devices that rely on the automatic speaker verification and/or speech recognition are also prone to audio spoofing attacks.

Audio spoofing attacks over the ASV systems can be categorized as voice replay attacks, voice-synthesis (or voice cloning) attacks, and voice conversion (VC) attacks. In replay attacks, the prerecorded voice of the genuine target speaker is played back to deceive the ASV system. Replay attacks pose the biggest threat as they are easy to launch, and the only precondition to launch these attacks is to have the prerecorded voice of the speaker. Moreover, as the feature representations of original and recorded signals are highly similar, therefore, ASV systems are unable to discriminate between them.

Voice-cloning technologies take the prerecorded voice samples of a speaker, and aims to produce speech samples that are perceptually indistinguishable from bonafide speech. The speech samples generated through voice cloning algorithms are even harder to detect as compare to voice replay attacks, the fundamental reason is that the non-linear components which consequently appear of a subsequent recording and also serves as a clue for replay are missing in the cloned-voice.

Instead of considering the audio-spoofing attack detection as a binary classification problem, where an audio sample is labeled as bonafide or spoofed, this disclosure considers this problem as a multi-layer and, multi-class classification problem. The target of the proposed system is to counter the replay attacks, identify the target speaker and the cloning algorithm that is used to attack, simultaneously. The reason for cloning algorithm detection is that—through cloning algorithm detection, this disclosure wants to identify the reasons that cause the ASV systems to fail over some spoofed audios. Moreover, through algorithm analysis, this disclosure aims to analyze the cloning-algorithm characteristics to develop a secure ASV system that can also counter the cloned-audios generated through unseen algorithms. In this regard, this disclosure emphasizes the following points: (1) speaker specific cloning algorithm behavior analysis; (2) overcoming the vulnerabilities of ASV components and classifier optimization to counter unseen algorithms; and (3) overcoming the class-imbalance problem to discriminate between the bonafide and spoofed audios.

This section provides background information related to the present disclosure which is not necessarily prior art.

SUMMARY

This section provides a general summary of the disclosure, and is not a comprehensive disclosure of its full scope or all of its features.

In one aspect, a computer-implemented method is presented for speaker verification. The method includes: receiving an audio signal from an unknown speaker; extracting features from the audio signal, where the features are based on patterns in the audio signal and a representation of the power spectrum of the audio signal; constructing a feature vector from the extracted features; and classifying the audio signal using the feature vector, where the audio signal is classified as one of authentic, recorded or computer generated.

The one or more of the extracted features represent a pattern in magnitude of data samples taken from the audio signal and may be quantized with a local ternary pattern. In some embodiments, the data samples are quantized using an adaptable threshold, where data samples are grouped into frames and the adaptable threshold for a given frame is a mathematical function of standard deviation of magnitude of data samples which comprise the given frame.

In one embodiment, the representation of the power spectrum of the audio signal is further defined as mel-frequency cepstrum coefficient and the is further defined as a Support Vector Machine.

In some embodiments, the at least one classifier is further defined as an ensemble of classifiers, where a first classifier in the ensemble of classifiers is trained to identify recorded audio signals and a second classifier is trained to identify computer generated audio signals. The first classifier and the second classifier may be trained using asymmetric bagging and subspace sampling.

In another aspect, the audio signal from the unknown speaker is classified using an ensemble of classifiers. In similar manner, a first feature is extracted from the audio signal, where the first feature represents a pattern in magnitude of data samples taken from the audio signal; and additional features are extracted from the audio signal, where the additional features represent the power spectrum of the audio signal. A feature vector is constructed by concatenating the first feature with the additional features. The audio signal is classified by a first classifier, where the first classifier is trained to identify recorded audio signals; the audio signal is classified by a second classifier, where the second classifier is trained to identify computer generated audio signals; and the audio signal is classified by a third classifier, where the third classifier is trained to identify authentic audio signals. Lastly, the audio signal is labeled as one of authentic, record or computer generated based on output from the first classifier, the second classifier and the third classifier.

In yet another aspect, a system is presented for secure speaker verification. The system includes: a feature extractor, an audio repository and one or more classifiers. The feature extractor is configured to receive an audio signal from an unknown speaker. The feature extractor operates to extract features from the audio signal and construct a feature vector from the extracted features. The extracted features include a first feature representing a pattern in magnitude of data samples taken from the audio signal and additional features representing the power spectrum of the audio signal.

The audio repository stores audio samples from a plurality of registered speakers, including an audio sample from the unknown speaker.

A classifier is interfaced with the audio repository and is configured to receive the feature vector from the feature extractor. The classifier is turn classifies the audio signal by comparing the feature vector to the audio samples in the audio repository, where the audio signal is classified as one of authentic signal, recorded signal or computer generated signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
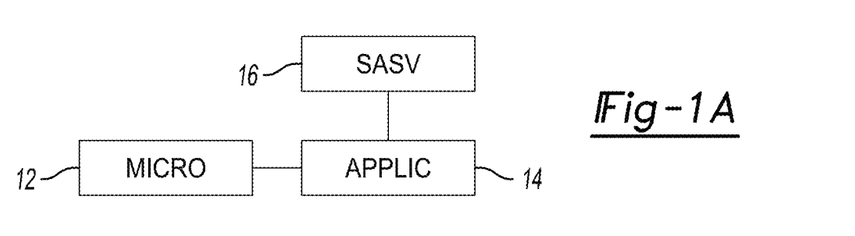
FIGS. 1A-1C illustrate different arrangements for a secure automatic speaker verification (SASV) system.
Figure 1B:
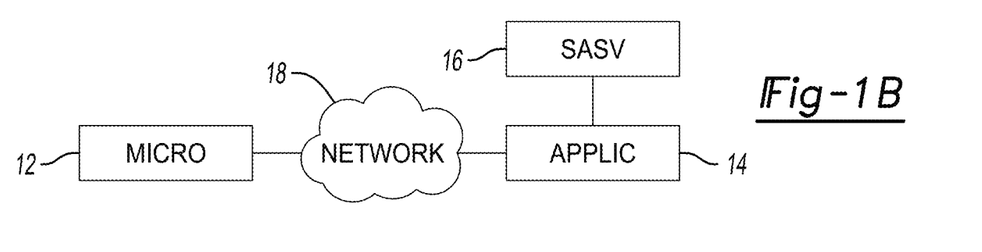
Figure 1C:
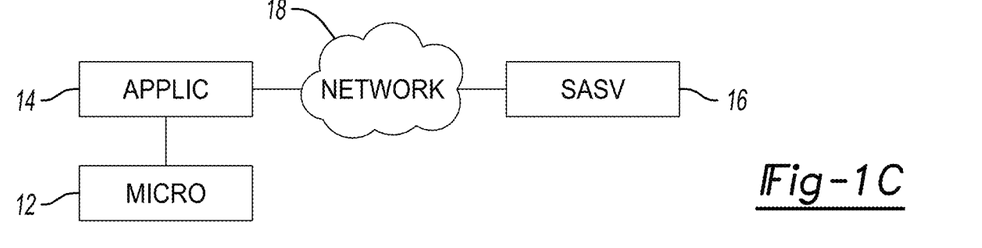

FIGS. 1A-1C illustrate different arrangements for a secure automatic speaker verification (SASV) system 10. The SASV system 10 is comprised generally of a microphone 12, an application 14 and a speaker verification subsystem 16. The microphone 12 captures an audio signal from a speaker and passes the audio signal as an input to an application 14. In one example, the application 14 is an online shopping application. The application 14 is in turn interfaced with a speaker verification subsystem 16. The speaker verification subsystem 16 verifies the identity of the speaker using the audio signal passed by the application 14 as will be further described below. The identity of the speaker is then passed by the speaker verification subsystem 16 back to the application 14. The online shopping application is merely one example of an application which may require speaker verification.

In FIG. 1A, the microphone 12, the application 14 and the speaker verification subsystem 16 reside on the same computing device. In FIG. 1B, the microphone 12 resides on a client computing device; whereas, the application 14 and the speaker verification subsystem 15 reside on a server computing device. In FIG. 1C, the microphone 12 and the application 14 reside on a client computing device; whereas, the speaker verification subsystem 16 resides on a server computing device. In both cases, the client computing device and the server computing device are interconnected by a network, such as the Internet. Other arrangements for the SASV system 10 are also contemplated by this disclosure.

Figure 2:
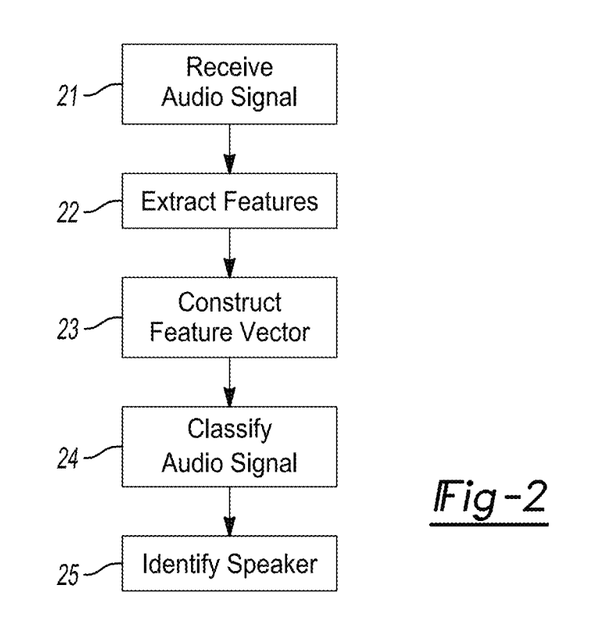
FIG. 2 is a flowchart provides an overview an improved method of speaker verification implemented by the speaker verification subsystem.

FIG. 2 provides an overview of an improved method of speaker verification implemented by the speaker verification subsystem 16 in accordance with this disclosure. As a starting point, an audio signal from an unknown speaker is received at 21 by a signal processor. It is assumed that input the audio signal is from a speaker who has previously registered with the speaker verification subsystem 16.

Features are extracted at 22 from the input audio signal. In an example embodiment, the extracted features include a first feature which represents a pattern in magnitude of data samples taken from the audio signal as well as additional features which represent the power spectrum of the audio signal. More specifically, the first feature is constructed by quantizing the data samples with a local ternary pattern. The data samples are preferably quantized using an adaptable threshold, where the data samples are grouped into frames and the adaptable threshold for a given frame is a function of standard deviation of magnitude of the data samples which comprise the given frame. The technique for constructing the first feature is described in more detail below. In one example, the additional features are further defined as mel-frequency cepstrum coefficients although other indicators for the power spectrum also fall within the scope of this disclosure.

A feature vector is then constructed at 23 from the extracted features. In the example embodiment, the feature vector includes the first feature and the additional features. That is, the first feature is concatenated with the additional features to form the feature vector.

Based on the feature vector, the audio signal is classified at 24 using at least one classifier. In particular, the audio signal is classified as one of an authentic audio signal, a recorded audio signal or a computer generated audio signal. Although the classifier is preferably implemented as a Support Vector Machine, neural networks, decision trees and other types of machine learning techniques are also contemplated by the this disclosure.

In the example embodiment, an ensemble of classifiers are used label the audio signal as one of an authentic audio signal, a recorded audio signal or a computer generated audio signal. In this example, a first classifier is trained to identify recorded audio signals, a second classifier is trained to identify computer generated audio signals and a third classifier is trained to identify authentic audio signals. Output from each of the classifiers is then combined and used to label the audio signal. The first classifier, the second classifier and the third classifier are preferably trained using asymmetric bagging and subspace sampling.

Additionally, speaker of the audio signal can be identified at 25 using the feature vector as well. In one example, the speaker is identified by comparing the feature vector to audio samples from registered speaker stored in an audio repository. In a similar manner, the speaker identification can also be accomplished with a classifier. It is to be understood that only the relevant steps of the methodology are discussed in relation to FIG. 2, but that other software-implemented instructions may be needed to control and manage the overall operation of the speaker verification subsystem.

Figure 3:
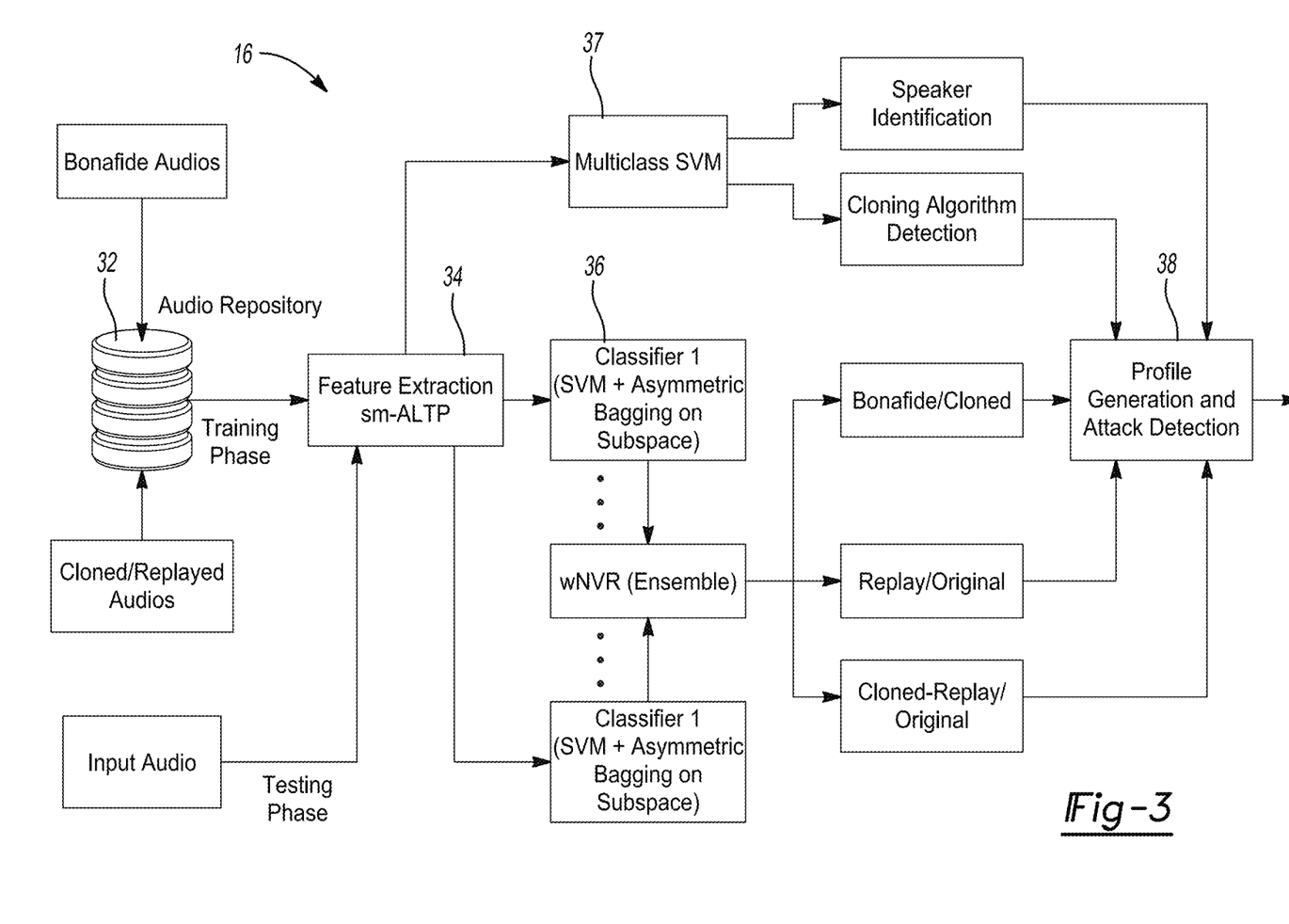
FIG. 3 is a diagram illustrating an example architecture for the speaker verification subsystem.

FIG. 3 further illustrates an example architecture for the speaker verification subsystem 16. In the example embodiment, the speaker verification subsystem 16 includes an audio repository 32, a feature extractor 34, and an ensemble of classifiers 36. The speaker verification subsystem 16 may further include an additional classifier 37 for speaker identification and/or cloning algorithm detection. A profile generator 38 receives output from each of the classifiers and generates a profile for an unknown speaker. These components may reside in and/or are implemented by one or more signal processors.

During operation, the feature extractor 34 receives an audio signal from an unknown speaker, extracts features from the audio signal and then constructs a feature vector from the extracted features, for example as further described below. One or more classifiers in the ensemble of classifiers 36 classifies the audio signal using the feature vector. In one example embodiment, the ensemble of classifiers 36 include three classifiers although more or less classifiers are contemplated by this disclosure.

The audio repository 22 includes replayed, cloned, and bonafide speaker-voices. In one example, the cloned-voices are generated through multiple voice cloning algorithms against each registered speaker. Thus, for m bonafide speakers and p voice cloning algorithms, one has (m×p) cloned-speaker classes. To counter the cloned audio samples, which are generated through any unseen voice-cloning algorithm over which the model training did not occur, the model may incorrectly predict the cloning algorithm type but still it will detect the cloning attack. In this case, the model will label the input audio as cloned audio. Similarly, for replay attack detection, input audio samples are labeled as replayed/authentic. Thus, there are q=m+(m×p)+2+2 number of speaker classes to be recognized.

Automatic speaker verification (ASV) systems are vulnerable to replay, voice cloning, and voice conversion attacks, hence, an effective audio representation mechanism should take into account the following facts. First, the microphone add a layer of non-linearity due to inter-modulation distortions, which induce the detectable patterns; thus an audio representation mechanism should be able to characterize these patterns during audio-fingerprinting to discriminate well between original and replayed audios. Second, the subsequent recordings of the same recording, which is very common in audio splicing attacks, consequently introduce higher-order non-linearities and make an audio signal more distinguishable through the pattern-based analysis. Third, the voice cloning algorithms also introduce distinct artifacts/distortions and needs an application of neighborhood statistics to capture these artifacts. Fourth, an audio representation mechanism for ASV systems should be less sensitive to the noise for acoustic environment independent audio processing.

For feature extraction, a novel feature extraction method is proposed and referred to herein as sign modified acoustic local ternary patterns (sm-ALTP). In an example embodiment, the features are based on patterns in the audio signal (e.g., local ternary patterns) and a representation of the power spectrum of the audio signal. The representation of the power spectrum may be defined as mel-frequency cepstrum coefficients although other representations are also contemplated by this disclosure. The sm-ALTP features are extension of ALTP features that are further described by Adnan et al. in Fall Detection Through Acoustic Local Ternary Patterns" Applied Acoustics, vol. 140, pp. 296-300 (2018) which is incorporated in its entirety.

For ALTP Features, an input audio signal Y[n] with N samples is partitioned into i={1; 2; . . . ; k} non-overlapping frames/windows $F^{(i)}$ with length l=9. In each frame $F^{(i)}$, c represents the central sample in a frame and has $z^j$ neighbors, where j represents the neighbor index in the frame $F^{(i)}$. To compute the ALTP response, the difference of magnitude spectrum between c and $z^j$ is computed by applying the parameter $t_h$ around the sample c. The value of the parameter $t_h$ lies between 0 and 1, and is obtained by performing linear search operation. Afterwards, the sample values in $F^{(i)}$ are quantized to zero that lie in the range of width$\pm t_h$ around c, whereas values above and below $c \pm t_h$ are quantized to 1 and −1 respectively. Thus, one obtain a three-valued function as:

$$p(c, z^j, t_h) = \begin{cases} -1 & z^j - (c - t_h) \le 0 \\ 0 & (c + t_h) < z^j < (c - t_h) \\ +1 & z^j - (c + t_h) \ge 0 \end{cases} \quad (1)$$

The function $p(c, z^j, t_h)$ is then decomposed into two patterns classes i.e. upper pattern $P^{up}(\cdot)$ and lower pattern $P^{lw}(\cdot)$ as:

$$p^{up}(c, z^j, t_h) = \begin{cases} 1 & p(c, z^j, t_h) = +1 \\ 0 & \text{Otherwise} \end{cases} \quad (2)$$

Similarly $$P^{lw}(c, z^j, t_h) = \begin{cases} 1 & p(c, z^j, t_h) = -1 \\ 0 & \text{Otherwise} \end{cases} \quad (3)$$

These upper and lower patterns are then used for upper and lower ALTP representation generation. The upper-ALTP features Au are computed using equation 4.

$$A_U = \sum_{j=0}^{j=l} P^{up}(c, z^j, t_h) \times 2^j \quad (4)$$

whereas, lower-ALTP features $A_L$ are computed through eq. 5.

$$A_L = \sum_{j=0}^{j=l} P^{lw}(c, z^j, t_h) \times 2^j \quad (5)$$

Afterwards, the histograms of Au and $A_L$ is computed by applying Kronecker delta function $\delta(\cdot)$ as described in eq. 6 and eq. 7

$$H^u(b) = \sum_{a=1}^{a=k} \delta(A_U^a, b) \quad (6)$$

$$H^l(b) = \sum_{a=1}^{a=k} \delta(A_L^a, b) \quad (7)$$

where b represents the bin and a represents the frame index. After computing the $H^u(b)$ and $H^l(b)$, the ALTP features are obtained by concatenating (//) both histograms as:

$$H_A = [H^u(b)|H^l(b)] \quad (8)$$

Figure 4A:
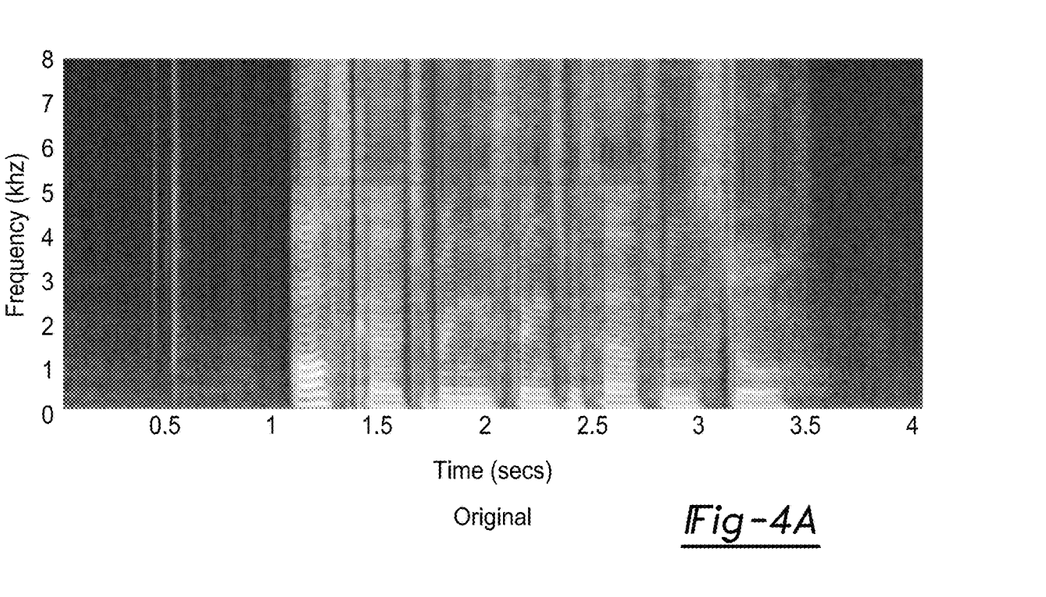
FIGS. 4A and 4B are images of spectral analysis of original and cloned utterances, respectively.
Figure 4B:
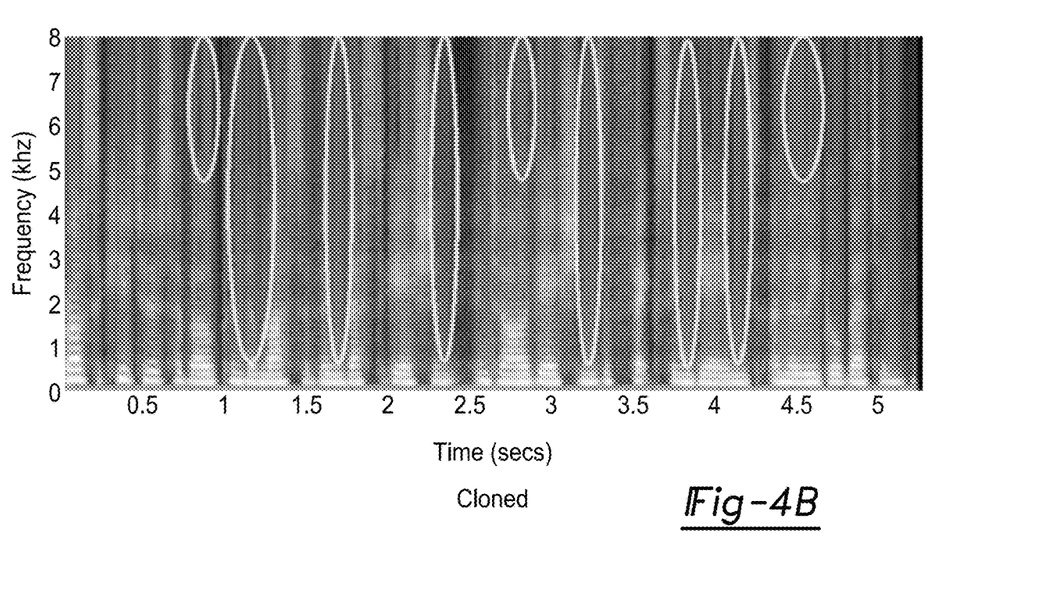

ALTP features were originally proposed for indoor applications i.e. fall detection; and due to the tolerance against noise showed very good performance as a feature descriptor against state-of-the-art feature extraction methods. However, there are some vulnerabilities of ALTP that needs to be overcome for their application in speaker verification systems. These vulnerabilities are—(a) non-static pattern detection—as shown in FIGS. 4A and 4B, the spectral analysis of the cloned audio reveals that the artifacts has non-static repetition pattern, which can be more effectively captured through a dynamic threshold mechanism. However, the ALTP has only the static threshold i.e. ±th, thus room for improvement exists in ALTP for speaker verification applications. (b) Signal volatility—to effectively capture the artifacts in cloned and replayed audios, it is important to know how quickly the signal is changing in terms of artifacts. ALTP features lack this attribute. Hence, the performance drops against the spoofed audios. (c) Brute-force Optimization—in ALTP, a brute-force approach for threshold optimization was required; consequently, error reduction was not guaranteed in time critical applications. (d) Noise uniformity—ALTP was robust against the uniform noise that remain consistent in the audio scenes e.g. indoor audios; whereas, in the outdoor environments as the noise is non-uniform, therefore, the static threshold-based feature extraction becomes inconsistent, hence, demands a different approach for noise suppression.

ALTP features were originally proposed for sound classification, and for sound classification there was no requirement to capture the vocal tract of the sound source, therefore, the ALTP features performed remarkably well against state-of-the-art feature extraction approaches. However, as in speaker verification, one needs to to discriminate amongst speakers in text-independent scenarios, therefore, it is important to model the vocal tract of the speakers.

sm-ALTP features overcome the limitations of ALTP features by defining a dynamic optimizable threshold, and capturing the vocal tract of the speaker. In sm-ALTP, three valued functions are computed as:

$$p(c, z^j, (\sigma \times \alpha)) = \begin{cases} -1 & z^j - (c - (\sigma \times \alpha)) \leq 0 \\ 0 & (c + (\sigma \times \alpha)) < z^j < (c - (\sigma \times \alpha)) \\ +1 & z^j - (c + (\sigma \times \alpha)) \geq 0 \end{cases} \quad (9)$$

where $\sigma$ is the standard deviation of $F^{(i)}$ and a is the scaling factor i.e. ($0 < \alpha < 1$). $\sigma$ can be computed as:

$$\sigma = \sqrt{\frac{\sum (z^j)^2 - \left(\frac{\sum z^j}{l}\right)^2}{l-1}} \quad (10)$$

By replacing $t_h l - 1$ with ($\sigma \times \alpha$), the limitations (a), (c), and (d) of the ALTP features are overcome, which demands the incorporation of the signal variance in terms of neighborhood statistics. Another limitation of the ALTP feature was that the $t_h$ needed the brute-force optimization through linear search. However, by defining the following convex function, one can optimize the new threshold value i.e. ($\sigma \times \alpha$).

$$J(\sigma) = \min \frac{\alpha}{2M} \sum_{q=1}^{q=M} \left( g(\theta^T \sigma(x^q)) - y^q \right)^2 \quad (11)$$

where $J(\cdot)$ is the cost function, $\theta$ are the classification weights, $q = \{1, 2, \ldots, M\}$ are the total number of records in the training-set, g is the classification function used (i.e. relu, sigmoid, tanh etc.), and $y^q$ represents the actual class-label of the audio record. The probabilistic interpretation of the cost function is:

$$p(y^q | x^q; \sigma) = \frac{1}{\sqrt{2\pi}\sigma} \exp\left(-\frac{y^q - x^q}{2\sigma^2}\right) \quad (12)$$

The parameter $\sigma$ can then be optimized by applying the gradient descent algorithm as:

$$\sigma_{new} = \sigma - \alpha \times \frac{\partial \sigma}{\partial z^j} \left( \frac{\sqrt{\sum (z^j)^2 - \left(\frac{\sum z^j}{l}\right)^2}}{l-1} \right) \quad (13)$$

where $$\frac{\partial \sigma}{\partial z^j} = \left[ \frac{\partial \sigma}{\partial z^1} \frac{\partial \sigma}{\partial z^2} \cdots \frac{\partial \sigma}{\partial z^l} \right] \quad (14)$$

Thus $$\frac{\partial \sigma}{\partial z^j} = \frac{1}{\sqrt{l-1}} \frac{\partial}{\partial z^j} \left[ \left( (z^1)^2 - \left(\frac{\sum z^j}{l}\right)^2 \right) + \ldots + \left( (z^{c-1})^2 - \left(\frac{\sum z^j}{l}\right)^2 \right) + \left( (z^{c+1})^2 - \left(\frac{\sum z^j}{l}\right)^2 \right) + \ldots + \left( (z^l)^2 - \left(\frac{\sum z^j}{l}\right)^2 \right) \right]^{1/2} \quad (15)$$

or in compact form one can write it as:

$$\frac{\partial \sigma}{\partial z^j} = \frac{1}{\sqrt{l-1}} \frac{1}{\partial z^j} \left( \sum (z^j)^2 - \left(\frac{\sum z^j}{l}\right)^2 \right)^{1/2} \quad (16)$$

thus, the partial derivative will return:

$$\frac{\partial \sigma}{\partial z^j} = \frac{1}{\sqrt{l-1}} \cdot \frac{1}{2} \cdot \left( \sum (z^j)^2 - \left(\frac{\sum z^j}{l}\right)^2 \right)^{-1/2} \times \left( 2z^j - \frac{2\sum z^j}{l^2} \right) \quad (17)$$

or

-continued $$\frac{\partial \sigma}{\partial z^j} = \frac{1}{\sqrt{l-1}} \cdot \frac{1}{2} \cdot \frac{1}{\sqrt{\sum (z^j)^2 - \left(\frac{\sum z^j}{l}\right)^2}} \times \left(2z^j - \frac{2\sum z^j}{l^2}\right) \quad (18)$$

By replacing the equations 2-5 with (σα), one gets the $H^u(b)$ and $H^l(b)$ using equations 6 and 7 and generate feature representation as:

$$H=[H^u(b)|H^l(b)] \quad (19)$$

The feature representation H captures the patterns present in the input signal but this representation lacks the vocal tract information that can be captured, for example through the cepstral coefficients at Mel-scale. For instance, at 1000 HZ, the cepstral coefficients of a particular speaker always appear negative due to phoneme representation attributed to the vocal structure of that particular speaker, and this frequency occurs very frequently; in case of sm-ALTP, a large positive histogram-spike will appear, but it will not provide any information regarding the vocal behavior at this particular frequency. Therefore, this disclosure proposes further processing the sm-ALTP representation using eq. 20.

$$H_s = H \times \text{sgn}(\mu_t(C_y(t))) \times \beta \quad (20)$$

where $C_y(t)$ is the $t^t_h$ order mfcc of the $y^t_h$ frame, $\mu_t$ is the frame-wise mean of $C_y(t)$, and t={1, 2, . . . , 20}. $C_y(t)$ is applied by computing the frame energy E(f) with index f as represented in eq. 21.

$$C_\gamma(t) = \sum_{j=0}^{g-1} \log\left[E(f)\cos\left[t\left(f-\frac{1}{2}\right)\frac{\pi}{q}\right]\right] \quad (21)$$

The parameter β=0.1 in eq. 20 is used for the feature normalization in $H_s$. The final representation for sm-ALTP features then can be represented as:

$$H_{sm}=[\mu_t(C_y(t))|H_s] \quad (22)$$

While reference has been made to mel-frequency cepstrum coefficients, other representations of the power spectrum of an audio signal also fall within the broader aspects of this disclosure.

No matter how much powerful feature extraction method could be, the characteristics of data in terms of data-quality, data-collection mechanism, and dataset size affects the classification performance in speaker verification systems. For instance, if a training-set is comprised of fewer bonafide representations and far more spoofed representations, the classifier tends towards the spoofed class. In this particular case, the higher classification accuracy may be an outcome of the bias towards the spoofed class; and in reality the classifier is giving far lower performance for the bonafide samples, which is a primary goal of any speaker verification system. Thus, even the higher classification accuracy will become insignificant. Meanwhile, it is fundamentally important to identify the reasons, which leads the classifiers to generate wrong output. In order to achieve this objective, for cloning attack detection, the cloning-algorithm used for spoofed audio generation is identified. By capturing the correlation between spoofed samples and the cloning-algorithm, classification models can further be improved. In the example embodiment, the classification model is designed for the following tasks: 1) speaker recognition for registered users; 2) cloning attack detection through seen and unseen algorithms; 3) algorithm detection used for cloned audio generation; 4) target speaker recognition in order to identify users with enhanced security requirements; and 5) replay and cloned replay attack detection. While approaching towards an efficient classification model, one can ensure that the complexity of testing process may not increase in a way to make the classification model inappropriate for a real-time application. Thus, the tasks where data representations are balanced (i.e. task 1, 3, and 4) are addressed through a single SVM classifier with polynomial kernel; whereas, for the tasks where dataset is highly imbalanced (i.e. task 2, and 5), multiple classifiers are trained through asymmetric bagging and subspace sampling.

In order to generate multiple classifiers, asymmetric bagging and subspace sampling is used in the proposed SVAS system 10. In asymmetric bagging, the bootstrapping is executed over the spoofed class samples as there are far more spoofed samples as compare to the bonafide samples. This way each classifier is trained over a balanced set using the complete bonafide set and a subset of spoofed samples, thereby improving the unstable SVM classification performance. The stable SVM classifiers that become able to discriminate well even the unseen bonafide and spoofed samples; whereas, if instead of using the asymmetric bagging, other data balancing methods are used (e.g., up-sampling or under-sampling), the classifier becomes either over-fit or under-fit and gives very low performance over the unseen samples. After the asymmetric bagging, the aggregation of multiple classifiers is performed, for example through the weighted normalized voting rule (wMVR) over the development-set. Other technique for aggregating output from multiple classifiers is also contemplated by this disclosure.

After training multiple classifiers, the outcome from the classifiers is combined. In the example embodiment, a weighted normalized voting rule (wNVR) is applied to aggregate the outcome of all of the classifiers although other aggregation rules, including majority voting rule, are contemplated by this disclosure. wNVR is a novel concept proposed for ensemble generation. The reason to choose wNVR over majority voting rule (MVR) is that the MVR is unable to take the advantage of the accurate classifiers and gives equal weight to all of the classifiers.

Let w={1, 2, . . . , Q} ensemble classifier is generated by applying weighted cross-entropy function:

$$C(x) = \sum_{\omega=1}^{Q} \lambda_\omega \sum_{b=1}^{M} \sum_{k=1}^{K} [y_b = k] \log \frac{e^{\theta_k^T x_b}}{\sum_{k=1}^{K} e^{\theta_k^T x_b}} \quad (23)$$

where λ is the weight, to take the advantage of more accurate classifier for k={1, 2, . . . , K} number of classes to be classified, and b={1, 2, . . . , M} are number of instances $x_b$ in development-set. The final class-label C*(x) is then generated as:

$$C^*(x) = \text{sgn}\left[C(x) - \frac{K-1}{2 \times s}\right] \quad (24)$$

The parameter s is the normalization factor to control the bias/variance effect.

After the training and model optimization, the trained model can be used for the evaluation purposes. The evaluation set is comprised of the examples having seen and unseen bonafide speakers and, in case of voice-cloning attack, having samples generated through seen and unseen algorithms. After model evaluation, any query audio sample can be passed to the final model and it can perform the speaker verification tasks in the real-time scenarios.

Figure 5:
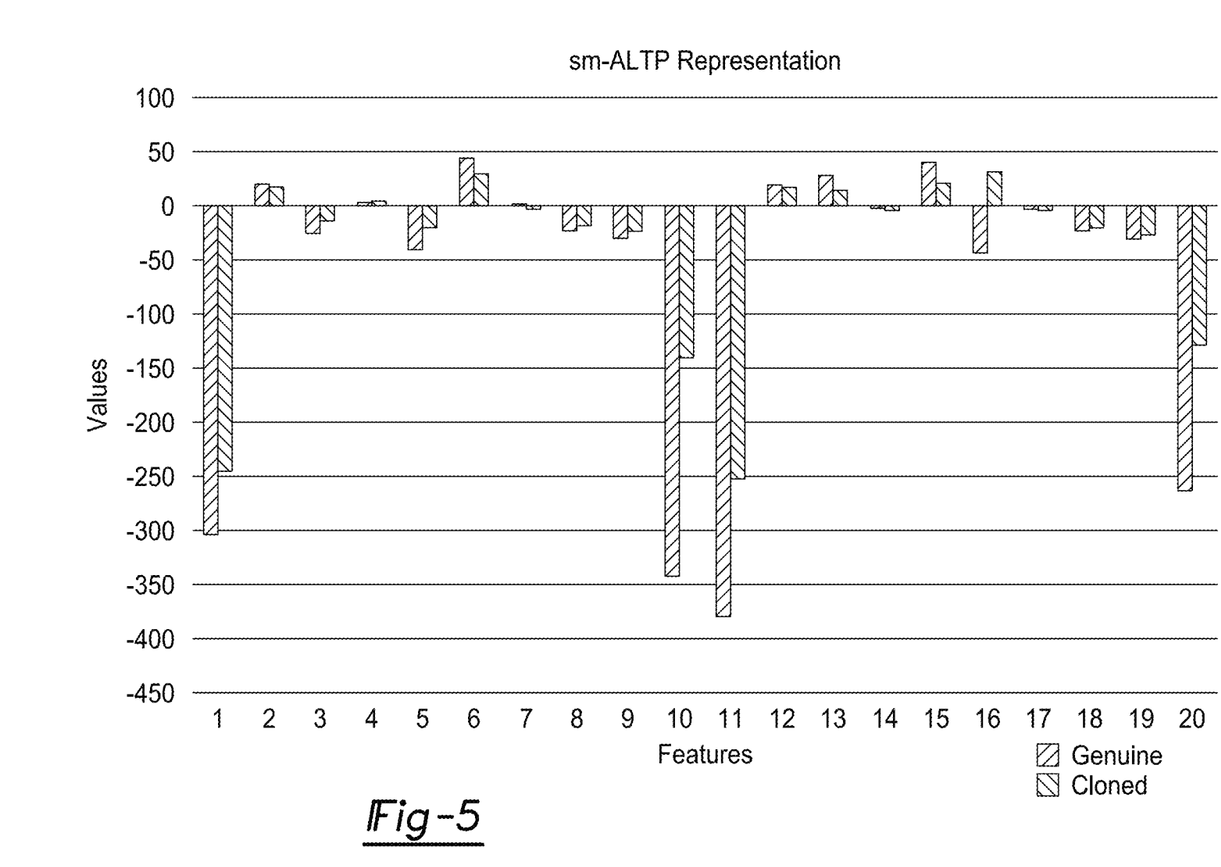
FIG. 5 is a graph depicting sm-ALTP representation for guine and cloned audio.

Existing approaches ignore some important signal characteristics during feature extraction, which consequently lowers their performance. For instance, the first three limitations emphasize that during the replay and voice cloning, the inter modulation, and algorithm artifact appears, which exhibits the distinguishable patterns. The proposed approach as perform the pattern analysis of the input signal, thus effectively captures these artifacts to distinguish the spoofed signals from the bonafide. For instance, as shown in FIG. 5, the bonafide and cloned-audio as exhibits the peak at same feature points but due to the difference of peaks, still these signals are easily distinguishable. Moreover, at some feature points e.g., feature 16 in FIG. 5, the bonafide and spoofed signals exhibits the peaks at opposite directions. The difference of the feature values in FIG. 4, shows that the cloned audio although appears similar to the genuine one, but still the essential signal components i.e., pitch, loudness, etc., are not perfectly replicated. However, the lower level analysis of the input signal through the proposed approach, easily reveals this difference.

Figure 6:
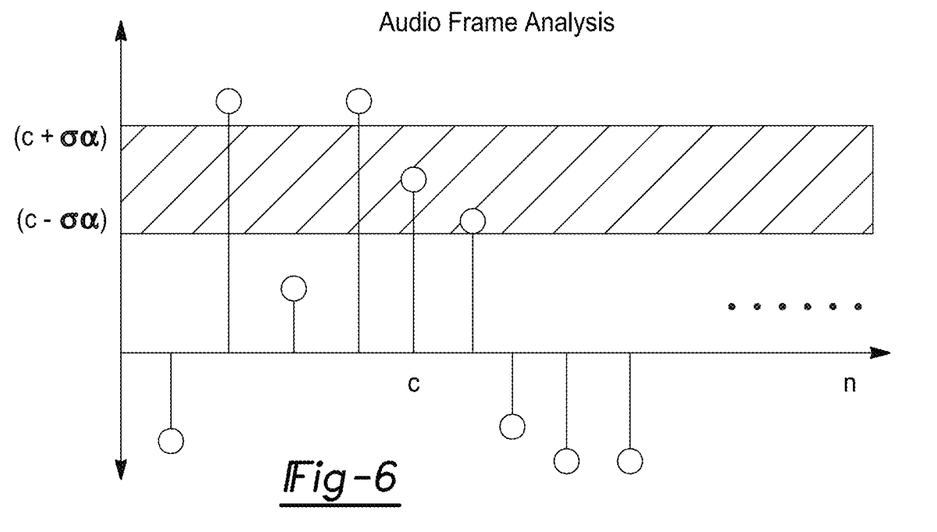
FIG. 6 is a diagram of an example audio frame.

Another limitation of the audio representation approaches was that, their robustness against noise was not easily quantifiable. However, the proposed approach is robust against noise and one can easily verify this claim. For instance, consider the audio frame shown in the FIG. 6. One can observe that the additive noise, which can either increase or decrease the value of central sample c in a frame $F^{(i)}$, and become a cause to generate the wrong code against c will become ineffective. The reason is that, the value of the sample c now lies in a range of upper and lower threshold values, hence, becomes more tolerant against additive values by noise. Moreover, due to the less complex features, the fast model retraining is possible; thus, make the proposed approach effective for the applications that has continuous user enrollment requirements.

Performance of the proposed system is evaluated on ASVspoof-2019 dataset, and voice spoofing detection corpus (VSDC). ASVspoof-2019 dataset (table I) further comprises two datasets i.e. logical access (LA) dataset for voice-cloning attacks detection, and physical-access (PA) dataset for replay attack detection. The LA-dataset has 25,380 samples for training, 24,844 samples for development, and 71,933 samples for evaluation purposes. The training-sets and development-sets contains the voice samples of 20 speakers (different speakers in both sets) that serves as the bonafide classes; whereas, the spoofed-set has cloned samples of the same speaker utterances generated through 2 voice-conversion and 4 speech synthesis algorithms comprising of 120 (20×6) spoofed speaker-plus-algorithm classes. The voice-conversion algorithms are based on (i) neural-network-based and (ii) transfer-function-based methods. Whereas, the speech synthesis algorithms are an implementation of (i) waveform concatenation, (ii) neural-network-based parametric speech synthesis using source-filter vocoders and (iii) neural-network-based parametric speech synthesis using Wavenet. The evaluation-set includes unseen bonafide and spoofed speech samples collected from multiple speakers. Whereas, spoofed set includes samples generated through 19 algorithms including the GAN-based, and deep neural network-based methods. The PA-dataset is comprised of 54,000, 33,534, and 15,3522 training, development, and evaluation samples respectively (Table I).

VSDC was designed for the replay, and cloned replay attack detection. The cloned-replays represents the recording of cloned voice samples; for this, the ASV spoof cloning samples were used to generate the replay samples in the similar manner as done for the bonafide voice recordings. The samples in the dataset are diverse in terms of environment, configurations, speaker-genre, recording, playback-devices, and number of speakers (Table II). More specifically, the samples contain noise and interference as well. To generate the replays, different playback devices were used to combat the effect of specific playback device. VSDC includes the voice samples of ten male and five female speakers who volunteered their services for data collection.

Next, performance of the proposed method is evaluated for bonafide speaker verification. Bonafide speaker verification is the primary task performed by any ASV system. As shown in Table III, proposed method is achieving average 99% precision, recall, f1-score, and accuracy values using 70-30 (i.e. 70% of data for training and 30% data for testing) ratio over ASV spoof-2019 dataset. For most of the classes, the evaluation rates are 100%; whereas, there is no class that may have more than 1 misclassified sample; and amongst 774 testing samples corresponding to 20 speaker classes, there are only 7 misclassified samples, which is ignorable. Moreover, even if one changes the training and testing ratios as 30-70 (i.e. 30% of data for training and 70% data for testing) still the proposed method gives 98% average precision, recall, f1-score, and accuracy values using 1806 samples for testing amongst 2580 total bonafide samples, which clearly signifies that this method is robust for ASV tasks.

Figure 7:
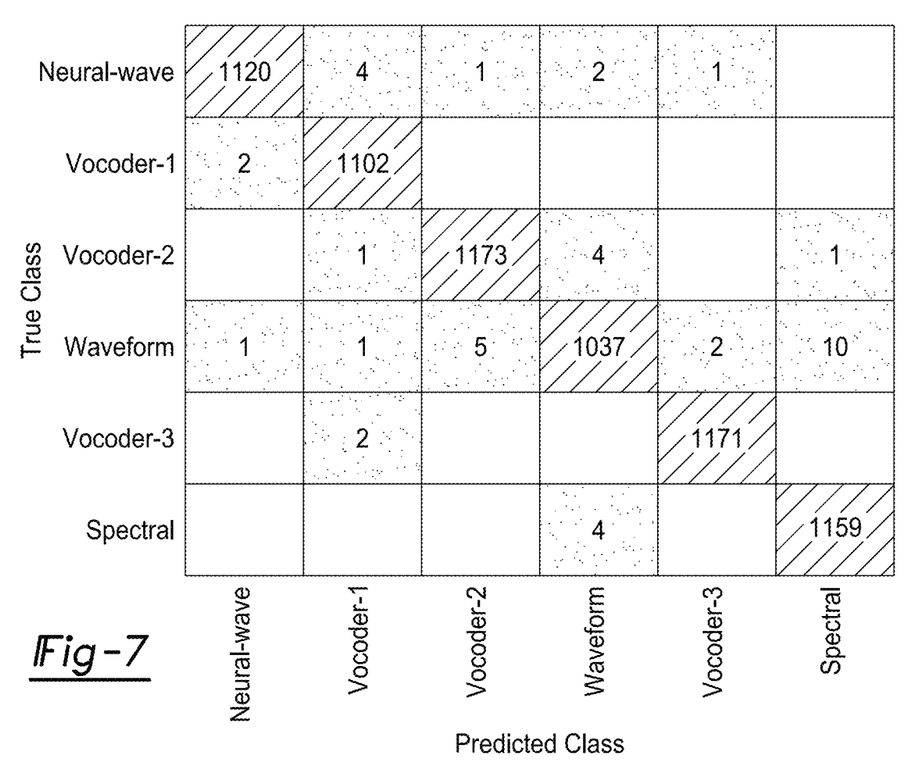
FIG. 7 is a confusion matrix for voice cloning and voice algorithm detection using 70-30 ratio.
Figure 8:
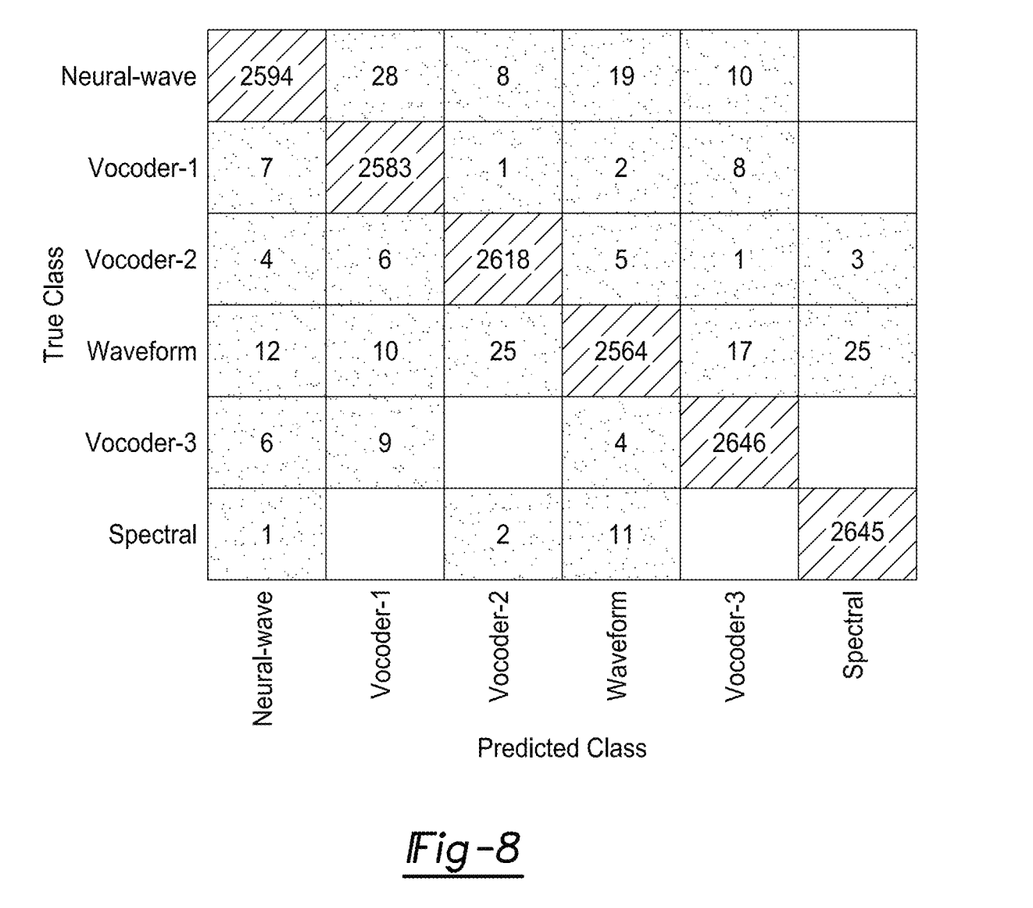
FIG. 8 is a confusion matrix for voice cloning and voice algorithm detection using 30-70 ratio.

In this experiment, the performance of the proposed method is evaluated for synthetic audio generation algorithms detection. The synthetic audio generation algorithms comprises both voice conversion, and speech synthesis algorithms as described above. From the results presented in Table IV, one can observe that the proposed method is approximately giving 100% performance in terms of all the performance evaluation measures. If one compares the confusion matrices presented in FIG. 7 and FIG. 8, one can observe that even increasing the testing samples from 6,803 to 15,874 still algorithm detection performance of the proposed method remain constant. Hence, the results confirm the hypothesis that the algorithms induce their specific properties/artifacts in the generated cloned audios that usually differs from the other audio generation algorithms; and a good audio representation with an effective classification mechanism can exploit these artifacts to perform the algorithm level detection; consequently, attack detection profile becomes more reliable. This feature, can particularly benefit the audio forensics applications by inciting more credibility particularly in the court cases.

In order to protect the registered users and ASV-based applications, it is important to identify which registered user voices have been compromised. With this information, additional security measures could be taken to further protect those particular speakers, and the applications. Thus, in this experiment, the algorithm and speaker information are combined and then used as training and testing labels as shown in Table V. In this way, using 6 audio synthesis algorithms, against 20 registered speakers, one has 120 audio classes. In Table V, the results of randomly selected 30 classes are presented; and from the results, it can be observed that the proposed method is giving 97% accuracy and average value of all the performance evaluation measures are also 97%. The difference between the accuracy values of Table VI and Table V is about 2.6%, which is due to the probability of a sample's partial association with particular output label. For instance, a sample miss-classifies a true speaker can still be associated with the correct voice cloning algorithm. Moreover, as in case of algorithm detection (table VI) as there were only 6 classes, so the margin of error was lower in that case. However, if an approach still gives high performance even by applying the drill down operation to further diversify the classification problem such method will be considered as reliable. Thus, on the basis of the results one can say that the proposed method reliably provides us the information about the compromised speakers, which is also a unique attribute of the proposed method.

For this experiment, 76,236 unseen examples are selected for evaluation purposes. Amongst these examples 9,902 examples are bonafide, and 66,334 examples are cloned. Whereas, these 76,236 examples are comprised of 5000 examples from the ASVspoof-2019 development-set, and 71,236 examples from the evaluation-set, which are never used for the training purposes. All of these examples have unseen speakers (20 speakers from development-set and 67 speakers from evaluation-set), and 19 different voice-cloning, and voice conversion algorithms (including 6 algorithms mentioned in Table IV and remaining 13 in Table VII) are used for cloned audio generation of these 87 speakers. As algorithms used for the audio synthesis are never used for training of the proposed method, therefore, the method cannot predict algorithm labels. Therefore, for this experiment the model is trained using the training-set with two labels i.e. bonafide and cloned. Thus, the aim of this experiment is to evaluate if the proposed method is able to discriminate between any bonafide/cloned audios, no matter who the speaker is or how the cloning is performed.

From the results presented in Table VI, one can observe that the proposed method is giving 88% overall accuracy. By further applying the drill-down operation on this accuracy value, it was found that accuracy for the bonafide class is 86%, whereas, for cloned class the average accuracy is 90%; hence, the overall accuracy becomes 88%. Amongst these 87 speakers, for 72 speakers average accuracy remains above 90%, which is fairly considering that only 20 speakers are used for training purposes, and those 20 speakers are not considered for evaluation purposes in this experiment. Similarly, as shown in Table VII, if one analyzes the 13 algorithms that were not used for training, it can be observed that for 8 algorithms accuracy is nearly 100%; whereas, for 2 algorithms accuracy is above 90%. The most problematic algorithms are A17-A19, where accuracy significantly drops. However, it can be observed from Table VII that, the number of samples in all these algorithm classes are least. A17 which is giving lowest accuracy is just approximately 27% (in terms of sample size) of A09 which has highest accuracy of 100% and also contains most number of samples. Therefore, based on this one can conclude that model optimization has positive correlation with sample size; and although external algorithm labels are not used but still our model identifies the correlation between the specific types of artifacts that any synthetic algorithm introduce; and it return the correct output for most of the samples.

For a good algorithm, higher accuracy value is one of the many requirements including algorithm performance in terms of precision, recall, and f1-score in class dependent scenarios. The reason for the class dependent analysis is that in case of imbalanced data, if a classifier even ignores the minor class, still it will give the higher overall accuracy and other performance evaluation measures. However, such higher evaluation values are unacceptable, as usually the minor class is the class of interest that must be considered.

For instance, for this experiment, bonafide class in the training-set has only 13% samples approximately; and if our algorithm labels every sample as cloned, still the overall accuracy will be 87%. However, this accuracy will be considered useless as bonafide speaker verification particularly for the registered users is the fundamental activity performed by any ASV system. Moreover, in the real-world scenarios, failure to verify the bonafide speakers will cause the frustration for the registered users and will result in form of financial losses for the companies providing the ASV services. However, by observing the results presented in table VI, one can analyze that the proposed method is giving 67% precision rate for bonafide class and 97% for cloned class. As the precision measure also take into account the false positive rate, therefore, for the highly imbalance data (as in our case where 13:87 ratio exist in both classes) the precision rate drops for bonafide class; whereas, the false positives in cloned class are as less, thus, they did not impose very high negative impact on the precision rate of the cloned class. However, in case of recall as we only consider the correctly classified examples in a class against all the relevant examples for that specific class; therefore, in case of bonafide class, the recall rates are 91% which are approximately 24% higher than the precision rate. Similarly, the recall rates drops by 6% for the cloned class and becomes 91%. Thus, the proposed method is giving good performance in terms of recall rate for the bonafide class; whereas, it is giving good performance in terms of precision rate for the cloned class. By combining precision and recall rates through f1-score, one get 81% and 94% for bonafide and cloned classes, respectively. The difference of the f1-score indicates that the model needs enhanced training-set to better classify the unseen bonafide examples. However, in the real-world scenarios, as one need the proposed SASV system to only correctly classify the registered bonafide speakers over which the model is trained as bonafide (as shown in Table III), thus by miss-classifying the unregistered users although they are bonafide is a good thing from the security's perspective.

In replay attack, the prerecorded voice of any bonafide speaker is played back before the ASV systems. As the voice samples belongs to the genuine speakers, therefore, the artifacts that appear during the voice synthesis are missing in the replay samples; thus, the audio fingerprints match exactly with the bonafide speakers, and the impersonation occurs. However, the deeper analysis of the replay samples reveals that a recorded voice also contains the non-linear components that can be used as a clue for replay attack detection. In order to detect the replay attacks, first elaborate what a replay samples comprises of: 1) replay and cloned replay patterns and 2) replay and cloned replay attack detection.

In order to apply the replay attacks, the chain of the microphones is involved i.e. one to record the speaker voice, and the next provided by the ASV system for system interaction. However, the electro-mechanical components present in the microphones e.g., carbon, electric, etc. introduce non-linearity in the input signal during the sound energy transformation into electrical signals; and any non-linearity in these elements results in a slightly distorted output. In general, the stiffness of the mechanical suspension and acoustical damping are the dominant causes of nonlinear distortion in most microphones, which can be categorized as harmonic-, inter-modulation-, and difference-frequency distortions. The harmonic distortion is the effect of non-linearity on a pure tone excitation, causing harmonic components in the output. The inter-modulation distortion is the effect of non-linearity produced at the output from an excitation that is sum of a stronger high frequency and a weaker low frequency component. The difference-frequency distortion is the effect of a non-linearity produced at the output from an excitation of sinusoids of the same amplitude. The first-order voice replay attack can be modeled as processing chain of microphone-speaker-microphone (MSM) which is equivalent cascade three 2nd-order systems considering that the speakers also behave in a non-linear manner. The processing chain representing a first order replay attack is therefore expected to introduce higher order nonlinearity due to cascading of MSM processing chain. The higher-order harmonic distortions therefore can be used to differentiate between a bonafide and spoofed audio. However, in case of cloned replays (introduced in the VSDC), the voice cloning artifacts further contains the non-linear components, thus have a similar behavior as of the deeper chaining of the MSM. Moreover, by simultaneously capturing the non-linear components and cloning artifacts through an effective audio representation mechanism, the cloned replays can be detected. The application of the cloned replays can be found in the text dependent scenarios, where a counterfeiter has the voice samples of a bonafide speaker, but those samples are different then the samples to launch the attack over the ASV system. Thus, one can say that the cloned replay attack detection is a fundamental requirement of a secure ASV system.

In this experiment, the performance of the proposed method is evaluated for the replay, and cloned replay attack detection on VSDC and ASVspoof-2019 datasets. From the results presented in Table VIII, one can observe that the proposed method achieves remarkable performance on both datasets for audio replay attack detection. More specifically, one obtains an average precision of 98.3% and 99%, recall of 98.5% and 99%, and F1-score of 98.4% and 99% on VSDC and ASV spoof datasets respectively. One can observe from the results that the proposed method performs slightly better on ASV spoof dataset over VSDC due to the fact that samples of VSDC are generated in more challenging and diverse conditions as compared to ASV spoof dataset. In VSDC, the proposed method achieves better performance for cloned replay attack detection as compared to first-order replay attack that confirms the findings that cloned signals becomes more distorted after replay as compare to the normal samples; thus, becomes more distinguishable as well.

This disclosure presents a secure automatic speaker verification (SASV) system that can recognize the registered ASV users, and also counter the audio synthesis, voice replays, and audio injection attacks. Audio synthesis detection module discriminates the original voices against the algorithmically generated synthetic audios and also provides the information about the algorithm that was used for cloned audio generation. Replay detection module counter the voice replays and cloned voice replay attacks. Whereas, the audio injection detection module counter the scenarios where a communication channel is compromised, and a hacker try to penetrate in the system by skipping the ASV steps. The proposed framework is based on the novel sm-ALTP features and ensemble learning through asymmetric bagging. Through asymmetric bagging, the class imbalance problem is overcome and a dynamic range of the SVM classifiers is generated. The evaluation on the ASV spoof-2019, and VSDC datasets, reveals that the approach effectively captures the spoofing patterns even they are generated through the unseen algorithms, thus provides a comprehensive security solution for ASV systems.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

TABLE 1

| Subset | # Speakers Male | # Speakers Female | Logical Access Bonafide | Logical Access Spoof | Physical Access Bonafide | Physical Access Spoof |
|---|---|---|---|---|---|---|
| Training | 8 | 12 | 2,580 | 22,800 | 5,400 | 48,600 |
| Development | 8 | 12 | 2,548 | 22,296 | 5,400 | 24,300 |

TABLE 2

TABLE II: Details of Voice Spoofing Detection Corpus (VSDC)

| Audio Samples | Sample Rate | Environment | Microphone Make | Model | Recording Device | Recording Source | Recording Device | |
|---|---|---|---|---|---|---|---|---|
| Bonafide | 4000 | 96K | Recording Chamber | Make | Model | | | 1st Order Replay | 2nd Order Replay |
| Replay | 4000 | | Kitchen | Audio-Technica | ST95MKII SM58 | Zoom R16 Olympus LS-12 | Male Speakers - 10 | Zoom R16 Laptop Audio Asus | Echo plus Gen-2 Echo |
| Cloned Replay | 4000 | | Table Living | shure | ECM 8000 | | | | |
| Total Replay Samples | 12000 | | Room Office Desk Dining Room Vehicle Ground | Behinger Electro-Voice | 635 A/B | | Female Speakers - 9 | GL504GM-DS74 USB Audio Card Ugreen 30521 | plus Gen-3 |

TABLE 3

| Speaker ID | Precision | Recall | F1-score |
|---|---|---|---|
| LA_0079_bon | 1.00 | 1.00 | 1.00 |
| LA_0080_bon | 0.97 | 0.94 | 0.96 |
| LA_0081_bon | 0.95 | 0.97 | 0.96 |
| LA_0082_bon | 1.00 | 1.00 | 1.00 |
| LA_0083_bon | 1.00 | 1.00 | 1.00 |
| LA_0084_bon | 1.00 | 1.00 | 1.00 |
| LA_0085_bon | 0.98 | 0.98 | 0.98 |
| LA_0086_bon | 0.95 | 1.00 | 0.97 |
| LA_0087_bon | 1.00 | 0.98 | 0.99 |
| LA_0088_bon | 1.00 | 0.97 | 0.99 |
| LA_0089_bon | 1.00 | 0.97 | 0.99 |
| LA_0090_bon | 1.00 | 1.00 | 1.00 |
| LA_0091_bon | 1.00 | 1.00 | 1.00 |
| LA_0092_bon | 1.00 | 0.98 | 0.99 |
| LA_0093_bon | 1.00 | 0.97 | 0.98 |
| LA_0094_bon | 1.00 | 1.00 | 1.00 |
| LA_0095_bon | 0.95 | 1.00 | 0.98 |
| LA_0096_bon | 1.00 | 1.00 | 1.00 |
| LA_0097_bon | 1.00 | 0.98 | 0.99 |
| LA_0098_bon | 0.95 | 1.00 | 0.97 |
| Accuracy | | | 0.99 |

TABLE 4

| Algo. ID | Algorithm | Precision | Recall | F1-score |
|---|---|---|---|---|
| A01 | Neural waveform model | 0.998 | 0.996 | 0.997 |
| A02 | Source filter vocoder-1 | 0.996 | 0.999 | 0.997 |
| A03 | Source filter vocoder-2 | 0.994 | 1.000 | 0.997 |
| A04 | Waveform concatenation | 0.990 | 0.987 | 0.989 |
| A05 | Source filter vocoder-3 | 0.997 | 0.995 | 0.996 |
| A06 | Spectral filtering | 0.998 | 0.997 | 0.998 |
| Accuracy | | | | 0.996 |

TABLE 5

| Algo + Speaker ID | Precision | Recall | F1-score |
|---|---|---|---|
| A01_LA_0079_spoof | 0.99 | 1.00 | 0.99 |
| A01_LA_0081_spoof | 0.98 | 0.98 | 0.98 |
| A02_LA_0086_spoof | 0.98 | 1.00 | 0.99 |
| A02_LA_0088_spoof | 0.98 | 1.00 | 0.99 |
| A03_LA_0091_spoof | 0.98 | 1.00 | 0.99 |
| A03_LA_0092_spoof | 1.00 | 1.00 | 1.00 |
| A04_LA_0095_spoof | 1.00 | 1.00 | 1.00 |
| A04_LA_0097_spoof | 1.00 | 0.98 | 0.99 |
| A05_LA_0079_spoof | 1.00 | 1.00 | 1.00 |
| A05_LA_0081_spoof | 1.00 | 1.00 | 1.00 |
| A06_LA_0094_spoof | 0.94 | 0.94 | 0.94 |
| A06_LA_0095_spoof | 0.96 | 0.91 | 0.94 |
| Accuracy for 120 classes | | | 0.97 |

TABLE 6

| Audio Label | Precision | Recall | F1-score | EER | min t-def |
|---|---|---|---|---|---|
| Bonafide | 0.67 | 0.91 | 0.81 | 5.22 | 0.132 |
| Cloned | 0.91 | 0.91 | 0.94 | | |
| Accuracy | | | 0.88 | | |

TABLE 7

| Algo. ID | Algorithm | No of Samples | Accuracy |
|---|---|---|---|
| A07 | Vocoder + GAN | 4823 | 0.98 |
| A08 | Neural waveform | 4855 | 0.99 |

TABLE 7-continued

| Algo. ID | Algorithm | No of Samples | Accuracy |
|---|---|---|---|
| A09 | Source filter vocoder-4 | 4893 | 1.00 |
| A10 | Neural waveform | 4878 | 0.99 |
| A11 | Griffin lim | 4882 | 0.99 |
| A12 | Neural waveform | 4603 | 0.94 |
| A13 | waveform concatenation + waveform filtering | 4908 | 1.00 |
| A14 | Source filter vocoder-5 | 4904 | 1.00 |
| A15 | Neural waveform | 4747 | 0.97 |
| A16 | Waveform concatenation | 4442 | 0.90 |
| A17 | Waveform filtering | 1352 | 0.28 |
| A18 | Source filter vocoder-6 | 1855 | 0.38 |
| A19 | Spectral filtering | 2345 | 0.48 |

TABLE 8

| Datasets | Sample Type | Precision | Recall | F1-Score | EER/min t-def |
|---|---|---|---|---|---|
| VSDC | Bonafide | 99 | 99 | 99 | 1.33/0.089 |
|  | Replay | 98 | 98 | 98 |  |
|  | Cloned Replay | 98.9 | 98 | 98.4 | — |
| ASVspoof | Bonafide | 99 | 99 | 99 | 0.75/0.0445 |
|  | Replay | 99 | 99 | 99 |  |

TABLE 9

| Dataset | Features | EER Replay | EER Cloning | EER Cloned Replay |
|---|---|---|---|---|
| VSDC | MFCC-GTCC-Spectral | 2.33 | — | 0.4 |
|  | ALTP-Spectral | 2.5 | — | 1 |
|  | ALTP | 2.9 | — | 1.2 |
|  | GTCC | 7.5 | — | 4.1 |
|  | sm-ALTP | 1.33 | — | 0.35 |
|  | (min t-def) | 0.089 |  | 0.031 |
| ASVspoof | MFCC-GTCC-Spectral | 6.75 | 0.6 | — |
|  | ALTP-Spectral | 1.5 | 0.8 | — |
|  | ALTP | 3.4 | 0.9 | — |
|  | GTCC | 8.4 | 6.1 | — |
|  | sm-ALTP | 0.75 | 0.5 | — |
|  | (min t-def) | 0.0445 | 0.037 |  |

TABLE 10

| Paper | Method | EER | min t-def |
|---|---|---|---|
| Baseline [50] | LFCC-GMM | 11.969 | 0.212 |
|  | CQCC-GMM | 9.87 | 0.236 |
| ASSERT [52] | logSpec-SENet | 11.75 | 0.216 |
|  | logspec-CQCC-SENet34-Mean-std-ResNet-SENet50-Dialated ResNet | 6.70 | 0.155 |
| STC [53] | LFCC-CMVN-LCNN | 7.86 | 0.183 |
|  | FFT-LCNN | 4.53 | 0.103 |
| Long Range Accoustics and Deep Features [8] | eCQCC-GMM, DNN | 7.04, 7.33 | 0.160, 0.168 |
|  | CQ-EST-GMM, DNN | 10.26, 11.79 | 0.251, 0.238 |
|  | CQ-OST-GMM, DNN | 8.40, 8.03 | 0.201, 0.188 |
|  | CQSPIC-GMM, DNN | 7.22, 7.70 | 0.199, 0.184 |
|  | ICQCC-GMM, DNN | 6.85, 12.48 | 0.164, 0.295 |
|  | CMC-GMM, DNN | 11.75, 13.37 | 0.241, 0.206 |
|  | Deep Features-GMM, DNN | 3.13, 5.23 | 0.086, 0.141 |
| BUT-Omilia [20] | logSpec-VGG-SincNet 1-SincNet 2 | 8.01 | 0.208 |
|  | SincNet with standard dropout | 8.01 | 0.356 |
|  | VGG 1-VGG 2 | 10.52 | 0.279 |
|  | SincNet with high dropout | 22.99 | 0.381 |
| MFMT [54] | MFCC-CQCC-FBank-multi task learning | 7.63 | 0.213 |
| Proposed | smALTP-Asymmetric Bagging | 5.22 | 0.132 |

What is claimed is:

1. A computer-implemented method for speaker verification, comprising:
   receiving, by a signal processor, an audio signal from an unknown speaker;
   extracting, by the signal processor, features from the audio signal, where one feature is indicative of variability of the audio signal and another feature is a representation of the power spectrum of the audio signal,
   wherein the one feature is derived by grouping data samples of the audio signal into frames and, for each frame, quantizing each data sample in a given frame in accordance with a difference in magnitude of a data sample with magnitude of a reference data sample in the given frame, thereby creating a pattern of values indicative of the variability of the audio signal;
   constructing, by the signal processor, a feature vector from the extracted features; and
   classifying, by at least one classifier, the audio signal using the feature vector, where the audio signal is classified as one of authentic, recorded or computer generated.

2. The computer-implemented method of claim 1 wherein magnitude of data samples are quantized with a local ternary pattern.

3. The computer-implemented method of claim 2 wherein the data samples are quantized using an adaptable threshold, where data samples are grouped into frames and the adaptable threshold for a given frame is a mathematical function of standard deviation of magnitude of data samples which comprise the given frame.

4. The computer-implemented method of claim 1 wherein the representation of the power spectrum of the audio signal is further defined as mel-frequency cepstrum coefficients.

5. The computer-implemented method of claim 4 further comprises training the first classifier and the second classifier using asymmetric bagging and subspace sampling.

6. The computer-implemented method of claim 1 wherein the at least one classifier is further defined as a Support Vector Machine.

7. The computer-implemented method of claim 1 wherein the at least one ensemble of classifiers is trained to identify recorded audio signals and a second classifier is trained to identify computer generated audio signals.

8. The computer-implemented method of claim 1 further comprises identifying the unknown speaker using the feature vector.

9. A computer-implemented method for speaker verification, comprising:
    receiving, by a signal processor, an audio signal from an unknown speaker;
    extracting, by the signal processor, a first feature from the audio signal, where the first feature is indicative of variability of the audio signal, wherein the first feature is derived by grouping data samples of the audio signal into frames and, for each frame, quantizing each data sample in a given frame in accordance with a difference in magnitude of a data sample with magnitude of a reference data sample in the given frame, thereby creating a pattern of values indicative of the variability of the audio signal;
    extracting, by the signal processor, additional features from the audio signal, where the additional features represent the power spectrum of the audio signal;
    constructing, by the signal processor, a feature vector by concatenating the first feature with the additional features;
    classifying, by a first classifier, the audio signal using the feature vector, where the first classifier is trained to identify recorded audio signals;
    classifying, by a second classifier, the audio signal using the feature vector, where the second classifier is trained to identify computer generated audio signals;
    classifying, by a third classifier, the audio signal using the feature vector, where the third classifier is trained to identify authentic audio signals; and
    labeling the audio signal as one of authentic, record or computer generated based on output from the first classifier, the second classifier and the third classifier.

10. The computer-implemented method of claim 9 wherein the first feature is extracted by quantizing the data samples with a local ternary pattern using an adaptable threshold, such that the data samples are grouped into frames and the adaptable threshold for a given frame is a mathematical function of standard deviation of magnitude of data samples which comprise the given frame.

11. The computer-implemented method of claim 10 wherein the additional features are further defined as mel-frequency cepstrum coefficients.

12. The computer-implemented method of claim 9 wherein at least one of the first classifier, the second classifier or the third classifier is further defined as a Support Vector Machine.

13. The computer-implemented method of claim 12 further comprises training at least one of the first classifier, the second classifier or the third classifier using asymmetric bagging and subspace sampling.

14. A system for secure speaker verification, comprising:
    one or more processors;
    a feature extractor configured to receive an audio signal from an unknown speaker, the feature extractor operates to extract features from the audio signal and construct a feature vector from the extracted features, wherein the extracted features include a first feature is indicative of variability of the audio signal and additional features representing the power spectrum of the audio signal,
    wherein the first feature is derived by grouping data samples of the audio signal into frames and, for each frame, quantizing each data sample in a given frame in accordance with a difference in magnitude of a data sample with magnitude of a reference data sample in the given frame, thereby creating a pattern of values indicative of the variability of the audio signal;
    an audio repository that stores audio samples from a plurality of registered speakers, including an audio sample from the unknown speaker; and
    a Classifier interfaced with the audio repository and configured to receive the feature vector from the feature extractor, wherein the classifier classifies the audio signal by comparing the feature vector to the audio samples in the audio repository, where the audio signal is classified as one of authentic signal, recorded signal or computer generated signal.

15. The system of claim 14 wherein the first feature is extracted by quantizing the data samples with a local ternary pattern using an adaptable threshold, such that the data samples are grouped into frames and the adaptable threshold for a given frame is a mathematical function of standard deviation of magnitude of data samples which comprise the given frame.

16. The system of claim 14 wherein the additional features are further defined as mel-frequency cepstrum coefficients.

17. The system of claim 14 further comprises
    a first classifier configured to receive the feature vector from the feature extractor and classify the audio signal using the feature vector, where the first classifier is trained to identify recorded audio signals;
    a second classifier configured to receive the feature vector from the feature extractor and classify the audio signal using the feature vector, where the second classifier is trained to identify computer generated audio signals; and
    a third classifier configured to receive the feature vector from the feature extractor and classify the audio signal using the feature vector, where the third classifier is trained to identify authentic audio signals.

18. The system of claim 17 further comprises a profile generator configured to receive out from the first classifier, the second classifier and the third classifier; and labeling the audio signal as one of authentic, record or computer generated based on output from the first classifier, the second classifier and the third classifier.

* * * * *

UNITED STATES PATENT AND TRADEMARK OFFICE
CERTIFICATE OF CORRECTION

| | | |
|---|---|---|
| PATENT NO. | : 12,354,607 B2 | Page 1 of 1 |
| APPLICATION NO. | : 17/792283 | |
| DATED | : July 8, 2025 | |
| INVENTOR(S) | : Hafiz Malik et al. | |

It is certified that error appears in the above-identified patent and that said Letters Patent is hereby corrected as shown below:

In the Claims

At Column 21, Claim number 11, Line number 45, delete "claim 10" and insert --claim 9--.

Signed and Sealed this
Fourth Day of November, 2025

John A. Squires
*Director of the United States Patent and Trademark Office*